Patented June 9, 1936

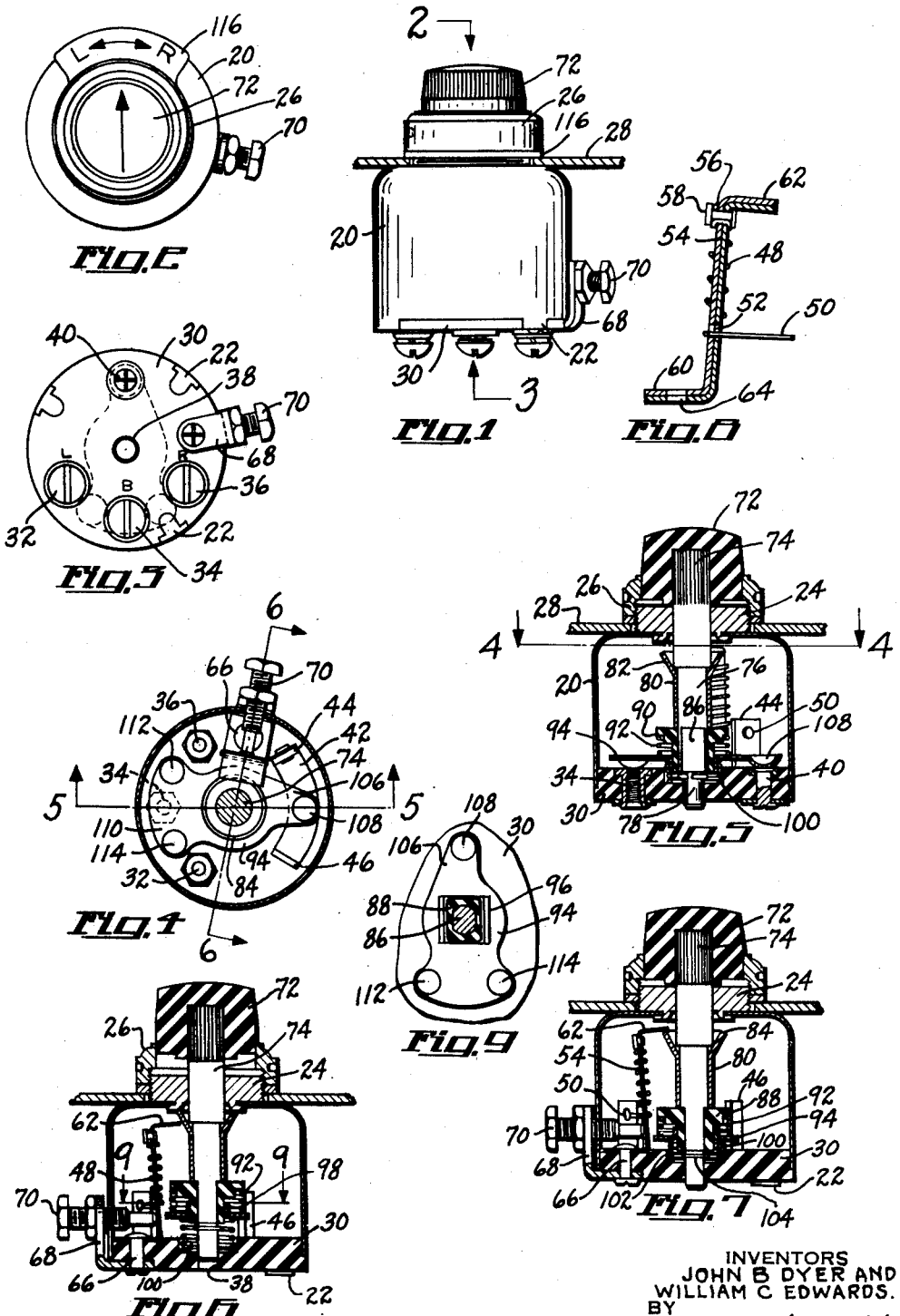

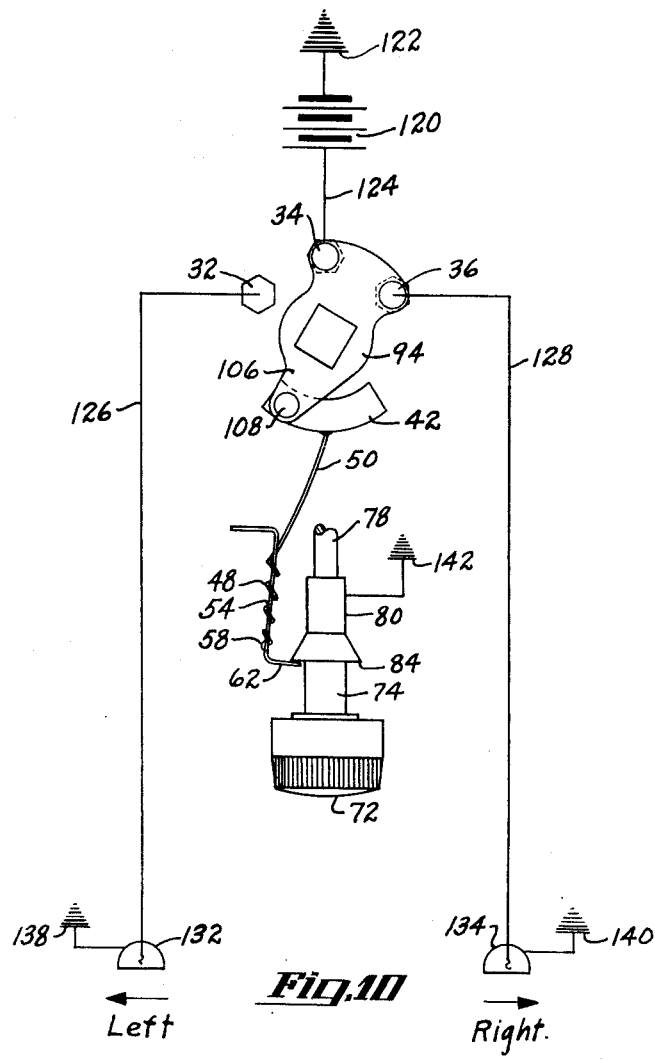

2,043,470

UNITED STATES PATENT OFFICE 2,043,470

SWITCH WITH AUTOMATIC RELEASE

John B. Dyer, Pendleton, and William C. Edwards, Anderson, Ind., assignors to General Motors Corporation, Detroit, Mich., a corporation of Delaware Application May 14, 1934, Serial No. 725,418

15 Claims. (Cl. 200—122)

This invention relates to signaling devices for automotive vehicles, where it is desired to warn a following vehicle, of the intention to change the course or direction of travel of a preceding vehicle, and has reference particularly to a device that is manually set before the change in course of travel is started, and that is automatically released upon the completion of such change in course of travel. Incidentally, the invention relates to a thermostatic switch in the nature of an improved form of direction indicating switch used in electric systems of automotive vehicles, and has among its objects to provide for the automatic opening of the switch after being manually set and latched a sufficient length of time.

A further object is to provide for the more effective operation and the better construction of direction indicating switches in order to make their use more effective in electrical systems for motor vehicles.

Another object is to provide a switching structure of simplified form, that is adapted to be set in either one of a plurality of circuit closing positions with the least amount of effort on the part of an attendant, and that will become automatically released after the signal has been displayed for a sufficient time.

Another object is to provide a switch of the class described, that is characterized by a delayed action release, so as to insure the display of a desired signal throughout a predetermined period of time.

A still further object is to provide means for varying the time element of release, so that the switching function can be suited to the varied demands.

With these and other objects in view, the invention comprises certain novel forms of construction, a preferred form of embodiment of which is shown in the accompanying drawings and described hereinafter.

In the drawings:

Fig. 1 is a side elevational view of the switch involving the present invention, shown attached to a panel that is in section.

Fig. 2 is a plan view of the switch substantially as indicated by the arrow 2 of Fig. 1.

Fig. 3 is a bottom plan view of the base substantially as indicated by the arrow 3 of Fig. 1.

Fig. 4 is a sectional view through the switch case, showing certain parts of the construction in plan, substantially as indicated by the line and arrows 4—4 of Fig. 5.

Fig. 5 is a longitudinal sectional view through the switch substantially as indicated by the line and arrows 5—5 of Fig. 4 showing the parts in circuit closed and latched position.

Fig. 6 is a longitudinal section view through the switch, substantially as indicated by the line and arrows 6—6 of Fig. 4 showing the parts in circuit-open position.

Fig. 7 is a view similar to Fig. 6 showing the switch in its closed and latched position.

Fig. 8 is an enlarged sectional view of the bimetal switch latch and thermal winding.

Fig. 9 is a plan view of the movable contact and its support substantially as indicated by the line and arrows 9—9 of Fig. 6.

Fig. 10 is a diagrammatic view of the circuit in which the switching unit is to be used.

In the art of direction signalling for automotive vehicles, it has been the practice to use switching devices by which the desired signal could be displayed. In the use of such devices an attempt has been made to incorporate them as automatically operating instrumentalities, whereby an indication of the progress of the vehicle would be made by turning of the steering wheel either to the right or to the left without any thought on the part of the driver. An objection to this form of signalling system, is that the signal is usually displayed too late in the progress of the vehicle to be a real warning, since the automatic mechanism is not actuated until the vehicle has actually performed a substantially part of the direction change, so that the signal merely becomes an indication of what has been done rather than what is going to be done. A following motorist is interested in what the preceding vehicle is going to do, and does not need to be informed of what has been done. Therefore, signalling devices that are automatically operable in response to the function that has been completed are inadequate.

On the other hand, devices have been provided wherein the switching mechanism is entirely manually operated, which requires that the automobile attendant set the signal switch to give the desired signal indication before the change in direction is made, and thence that he release or cancel the signal displayed after the change in direction has been made. This system too, has its objections, in that the attendant under the excitement of driving, and especially in the metropolis where the signalling devices are of the greatest import, is likely to forget to release or cancel the signalling circuit after he has made the turn. In instances of that kind, the signal displayed is worse than useless, for if the signal is not canceled after making the indicated turn, then the vehicle may travel a considerable distance across numerous intersections with the direction indicating signal still displayed and without the vehicle being manipulated as is indicated by the displayed signal.

Following motorists in that instance are at a loss to know what to do, for a turn indicating signal is displayed on the car preceding, and yet the preceding car crosses intersection after intersection without following the course that has been indicated to the following motorist. Therefore, a switching device that is entirely manually operable, is not satisfactory to solve the problem of faithfully warning the following motorist of an intended change in the course of direction.

The problem has been solved herein by providing a system of operation incorporating a single unitary subassembly of structure, that makes provision for manually and selectively setting the signal, and for automatically releasing or canceling the signal displayed after a predetermined extent of time, whether or not the designated change in direction of progression has been made. This clearly obviates the necessity of giving any further attention to the installation, or to its operation, other than to actuate it so as to give the desired signal at the time a change is decided upon.

In solving the problem, and in accomplishing the objects hereinabove set forth, there has been provided a series of contacts and terminals arranged in a definite group, so as to be selectively engageable by the elements of a movable contact or bridging member carried by an actuator, which actuator is both depressible and rotatable so as to be selectively engaged with different ones of the switch contacts. A bimetallic latch, supporting a heating coil, is arranged to engage a part of the actuator assembly when it has been depressed to the circuit closing position. In the depressed position of the actuator, the heating coil is connected with the energy source so that as the coil heats up it causes the bi-metallic latch to warp and bend away from a detent part of the actuator assembly, whereupon the signal circut is opened through the action of a spring pressing against the actuator assembly.

Referring to the drawings particularly, 20 indicates a cup-like housing member whose open end is provided with tongues 22 for securing a terminal back 30, as a closure for the case. The bottom wall of the cup is apertured to receive a hub 24, that is exteriorly threaded to receive a gland nut 26, that cooperates in mounting the structure upon a support 28. The support may be a part of the vehicle, as the instrument panel, or a bracket attached to the steering post or the like.

The terminal back 30 provides a plurality of contacts 32, 34 and 36 arranged in an arc-like or circular row about a central aperture 38. A fourth terminal member 40 is also arranged in the circular row, and is in conductive engagement with an arc-like strip 42. The contact strip 42 has right angular extensions 44 and 46 at each end thereof and upstanding from the face of the back 30 so as to act as stop members or guides. The guide lug 44 also acts as a binding post or as a connector for a heating wire 48 that is connected at 50 with the lug, thence passed through an aperture 52 of a bi-metal latch 54, and thence is wrapped about the same to be anchored at 56, where electrical connection is insured by reason of a rivet 58. The bi-metal latch member 54 comprises a strip of dissimilar metals bonded together and having right angular and oppositely extending arms 60 and 62, the arm 62 constituting a latch member while the arm 60 provides a supporting lug. This lug is apertured at 64 for reception of a rivet 66, passing through the switch back 30 and an angular member 68 that supports an adjusting screw 70. The screw 70 is arranged to engage the body of the bi-metal strip and flex it toward and away from the center of the assembly, so that the degree of latching of the arm 62 may be varied as conditions may warrant.

The actuator assembly provided for the switching device, constitutes a knob or button 72 secured upon the end of an actuating rod 74, whose intermediate portion 76 and end portion 78 are successively reduced in cross section, so that when assembled the portion 74 will be rotatably and slidably guided in the bore of the hub 24, and so that the portion 78 will be similarly movable in the hereinbefore mentioned aperture 38 in the switch back 30. Disposed over part of the intermediate portion of the rod, there is a sleeve-like member 80 terminating in an oblique flange 82, acting as a collar to seat against the shoulder of the reduction, and to form a detent 84 engageable behind the latch 62 of the bi-metal element. Near the lower end of the sleeve 80, or rather coincident with the lower end thereof, the intermediate portion 76 of the shaft is provided with flat portions 86. Upon these flats is disposed a nonconducting bushing 88 so as to have driving engagement therewith, substantially as illustrated in Fig. 9.

The bushing 88 rests against the lower end of the sleeve 80 and provides a ledge 90 near its periphery for seating a spring 92, whose opposite end engages against the body of a contact plate or bridging member 94. The central portion of the plate 94 is provided with a nonrounded aperture 96 to fit over the shank of the bushing 88, so as to be driven thereby. In forming the central nonrounded aperture of the plate 94 the metal therefrom may be left upstanding as at 98 so as to reinforce the body of the metal. A second spring 100 is disposed on the opposite side of the plate 94 and rests within a recess 102 about the central aperture 38, all of which provides a floating support for the contact assembly 94. The contact assembly, or rather the bushing driving the same, is maintained in position by means of a pin or anchoring means 104 passing through the end of the shaft at the reduced portion 78.

The combined effect of the springs 92 and 100, makes for a quick return of the actuator assembly when the latch becomes disengaged, as well as provides a floating support for the contact assembly. The bushing 88 always travels with the rod 74, but the contact plate 94 is capable of longitudinal movement along the bushing though always maintained in the same angular relation with respect thereto and to the rod 74. This is provided by the differential action of the springs 92 and 100, through which the rod 74 is capable of greater axial movement than is the contact plate 94. When the rod 74 is depressed partly, the plate 94 will engage and stop at the back member 30 thereby compressing the spring 100. The actuator assembly may be further depressed until the flared or detent portion 84 of the sleeve is secured behind the latch 62. This further movement of the actuator assembly causes relative axial movement of the bushing 88 and the plate 94, which results in the compression of the spring 92. The contact plate 94 is thus spring urged into firm contact with the selected ones of the circuit terminals on the back member 30. Both springs 92 and 100 being compressed, tend to effect the return of the actuator assembly as soon as the latch 62 is disengaged. As soon as the actuator assembly returns to a point such that the force of the spring 92 is less than the force of the spring 100, the latter will move the contact plate 94 away from the back 30.

The bridging member 94 has an arm 106 carrying a contact point 108 that is disposed substantially diametrically opposite of a web portion 110 carrying contact points 112 and 114. As the bridging member 94 is disposed on the actuator assembly it is oriented with respect to the terminal back 30, so that the arm 106 overlies the contact strip 42 and is confined between the guide lugs 44 and 46. This disposes the web portion 110 so that the contact points 112 and 114 will be selectively engageable with certain ones of the contact terminals 32, 34 and 36. Selective movement of the bridging contact member is made possible by the knob or button 72 by which the actuator assembly may be turned to either right or left hand position, as indicated by the legends L and R on the index plate 116, and thence the actuator assembly is depressed or pushed inwardly until the latch element 62 springs over the detent element 84. When this has been accomplished the desired signal circuit will be closed, and the circuit thereby completed will be somewhat as is incorporated in Fig. 10 of the drawings.

The electrical circuits within which the controlling unit is to be connected, includes a battery or source of energy 120 with a ground connection at 122, and a conductor 124 in communication with the terminal 34 on the switch back. The fixed terminals 32 and 36 are provided with leads 126 and 128, respectively, leading to the filaments of signal lamps 132 and 134, or corresponding portions of the same lamp, and from which the grounding connection is made as at 138 and 140. Of course it will be understood that the actuator assembly of the switch construction has a grounding connection through the metallic parts thereof. This will be seen by reference to Fig. 5, where the sleeve 80, in metallic engagement with the controller rod whose portion 74 engages the hub 24 that has metallic connection with the support 28 through the housing cup 20 and nut 26. All of this is indicated generally in Fig. 10 by the reference character 142.

In operation, the attendant turns the knob 72 either to left or right as indicated in Fig. 2, which will dispose the bridging member 94 over the contact elements 32, 34 and 42, or over 34, 36 and 42. Now, when the actuator assembly is depressed the bridging member 94 is brought into engagement with the selected contacts say 34, 36 and 42, which completing a circuit from the source 120 through the fixed contact 34 to the plate 94. From this point two branches are formed, one of which includes the conductor 128 and lamp 134 with its ground connection, while the other branch includes the contacts 42, connection 50, the heating wire 48 bi-metal, 54, latch element 62, detent element 84, and the ground at 142. That is to say, the signal circuit and the latch releasing means, while energized from the same source of energy, are associated in two parallel branches. The current flowing through the latch releasing mechanism will cause the bi-metal element 54 to flex sufficiently that the latch 62 will be withdrawn from the detent 84, whereupon the springs 92 and 100 will operate to return the actuator assembly to the circuit open position. This return movement of the actuator assembly causes both the signal circuit and the latch releasing circuit to be opened. The heating wire about the bi-metal element, not being energized, the bi-metal element readily cools off and reflexes to its normal position, wherein it is adapted to be again engaged behind the detent element 84 on a subsequent depression of the actuator assembly.

While the embodiment of the present invention as herein disclosed, constitutes a preferred form, it is to be understood that other forms might be adopted, all coming within the scope of the claims which follow.

What is claimed is as follows:

1. In an automatic switch, the combination comprising, a terminal support, stationary contacts arranged in a circular row, a movable switch member for bridging one of the stationary contacts with selected ones of the other contacts, a thermostatic element normally adapted to retain the switch member in circuit closed position, and a controller for depressing and rotating the movable switch member into either of the bridging relations, said thermostatic element being operable to retain the switch parts in circuit closed position for a predetermined length of time.

2. In an automatic switch, the combination comprising, a terminal support, stationary contacts arranged in a circular row, a control rod piloted in said terminal support for rotary and reciprocable movement relative thereto, a floating contact yieldingly carried by said control rod and engageable with each of the stationary contacts, a thermostatic latch, and detent means provided by the control rod permitting the floating contact to be rotated and to be depressed into engagement with selected ones of the stationary contacts.

3. In means for controlling a plurality of electrical circuits, a selective controlling device for closing either of said circuits comprising in combination, a plurality of fixed contacts, a rotary and reciprocable selector rod, a movable contact carried by the rod and adapted to selectively connect one of the fixed contacts with any one of the remaining fixed contacts, a latch for setting the rod in the position selected and for retarding the return movement of the selector after it is set, and means responding to current flow for withdrawing the latch after a predetermined period of contact closure.

4. In means for controlling a plurality of electrical circuits, a selective controlling device for closing either of said circuits comprising in combination, a terminal base, stationary contacts arranged in a circular row, a controller mounted for oscillating and reciprocating movement with respect to said base, a bridging contact carried in insulated relation with respect to said controller, said bridging contact being depressible into engagement with the stationary contacts, and also being oscillatable so as to engage selected ones of the stationary contact, a bimetallic latch, and means carried by the controller for engaging behind the latch when any of the stationary contacts are bridged, said latch means being responsive to the flow of current through the bridged contacts to release the bridging relation after a predetermined length of time.

5. In means for controlling a plurality of electrical circuits, a selective controlling device for closing either of said circuits comprising in combination, a terminal support, switch contacts arranged in a circular row, a controller piloted for movement at the center of said row of contacts, a floating contact device supported by the controller, said controller being axially movable so as to bring the contact device into engagement with the switch contacts, and rotatable to determine the particular ones of the contacts to be engaged by the contact device, means including a part carried by the controller for latching the contact device in engaging relation with the selected ones of the switch contacts, and thermal means for withdrawing the latch after a predetermined period of contact engagement.

6. The combination of a device for controlling the electrical circuits of a series of signals including a plurality of fixed contacts, a movable contact device adapted to connect one of the fixed contacts with selected ones of the others of the fixed contacts, means for retaining the contact device in any one of the contact engaging positions, and electro-thermo means energized coincident with the connection of any of the fixed contacts for withdrawing the latch, whereby the contact device may regain its normal position.

7. In a switch for use in signal circuits, the combination comprising, a terminal support, a plurality of contacts carried by the support, a contact device, a controller supporting the contact device and adapted to move the contact device into selected ones of a plurality of contact engaging relations, a stop member provided by the controller, electro-thermo means carried by the support for holding the contact device in its set condition, said means being responsive to the flow of current through the selected contacts for withdrawing the latch.

8. In a switch of the class described, the combination comprising, a plurality of circuit terminals, a bridging member for engagement with selected ones of the circuit terminals, means for depressing and rotating the bridging member into the desired circuit terminal engagements, and means including a part of said depressing means for temporarily holding the bridging member in engagement with the circuit terminals, said last named means responding to the flow of current through said connected terminals for releasing the terminal engagement after a predetermined length of time.

9. In a switch of the class described, the combination comprising, a terminal support, a plurality of circuit terminals carried by the support, a bridging contact, a controller depressible and rotatable so as to move the bridging contact into engagement with desired ones of the circuit terminals, and means carried by the terminal support for maintaining the bridging member in engagement with the circuit terminals throughout a predetermined period of time, said means comprising, a bi-metal latch and a cooperable detent carried by the controller, a heater wire disposed about the bi-metal latch and in electrical communication with one of the circuit terminals, and means supported from the terminal base for varying the latching relation.

10. In a switch of the class described, the combination comprising, a terminal support, a plurality of circuit terminals carried by the support, fixed contacts for each terminal and arranged in a circular row, one of the contacts having upstanding spaced extensions, a bridging contact adapted to connect the said one contact with selected plural members of the remaining contacts, and an actuator for depressing the bridging contact into engagement with the selected fixed contacts, and for rotating the bridging contact within the limits defined by the extensions of the said one contact.

11. In a switch of the class described, the combination comprising, a terminal support, a plurality of circuit terminals carried by the support, a bridging contact, a controller depressible and rotatable so as to move the bridging contact into engagement with desired ones of the circuit terminals, a bi-metallic latch carried by the terminal support and adapted to spring behind a part of the controller for temporarily maintaining the bridging contact in circuit closed relation, and means for altering the engagement of the latch and the controller part.

12. In a switch of the class described, the combination comprising, a terminal support, a plurality of circuit terminals carried by the support, a bridging contact, a controller depressible and rotatable so as to move the bridging contact into engagement with desired ones of the circuit terminals, a bushing driven by the controller and supporting the bridging contact, and springs engaging each side of the bridging contact, one of which yieldingly maintains the contact engagement when the controller is in the depressed position, and another of which tends to return the controller and bridging contact to a circuit open position, when the latch is released.

13. A selective controlling device for closing either one of a plurality of circuits, comprising in combination, a terminal support providing a plurality of fixed contacts, a contact plate adapted to connect one of the fixed contacts with selected ones of the remaining fixed contacts, a control rod operable upon the contact plate to move the plate into any one of the selected circuit closing positions, and means responsive to flow of current through the plate for disconnecting the plate from the selected contact in any of the several positions.

14. A selective controlling device for closing either one of a plurality of circuits, comprising in combination, a terminal support providing a plurality of fixed contacts, a contact plate for connecting one of the fixed contacts with selected ones of the other fixed contacts, means for pressing the contact plate into engagement with the terminal support and for rotating the contact plate for selecting the fixed contacts that are to be connected, a thermostatic latch electrically connected with the said one fixed contact adapted to latch the said means in the selected circuit closing position, said thermostatic latch being energized electrically coincident with the bridging of any of the selected fixed contacts.

15. A selective controlling device for closing either one of a plurality of circuits, comprising in combination, a terminal support providing a plurality of fixed contacts arranged in a circular row, a floating contact plate for bridging one of the contact plates with the selected ones of the other contact, one of said fixed contacts being arranged for common connection with each of the other fixed contacts when the contacts are so bridged, and stops provided by the common contact confining the rotative movement of the contact plate, and a bi-metal latching device adapted to hold the bridging contact in the selective position, said bi-metal latch being electrically connected with the common contact.

JOHN B. DYER.
WILLIAM C. EDWARDS.